H. L. KENT.
GAS ENGINE CARBURETER.
APPLICATION FILED JAN. 17, 1918.
1,371,562.
Patented Mar. 15, 1921.
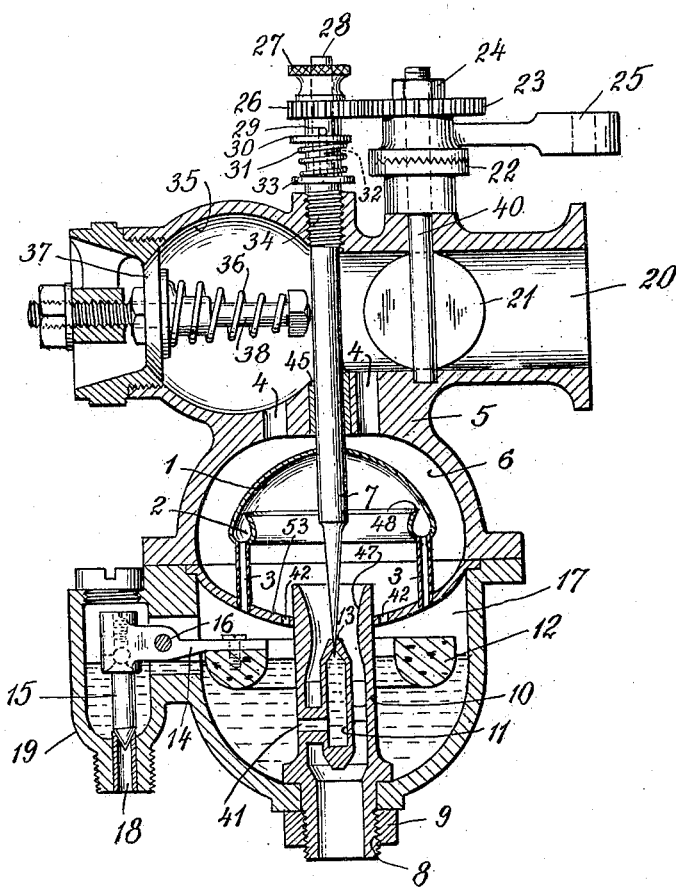
INVENTOR
Horace L. Kent
BY
Harry L. Duncan ATTORNEY

UNITED STATES PATENT OFFICE.

HORACE L. KENT, OF BROOKLYN, NEW YORK.

GAS-ENGINE CARBURETER.

1,371,562.  Specification of Letters Patent.  Patented Mar. 15, 1921.

Application filed January 17, 1918. Serial No. 212,314.

*To all whom it may concern:*

Be it known that I, HORACE L. KENT, a citizen of the United States, and resident of the borough of Brooklyn, county of Kings, city and State of New York, have made a certain new and useful Invention Relating to Gas-Engine Carbureters, of which the following is a specification, taken in connection with the accompanying drawing, which forms part of the same.

This invention relates especially to carbureters for automobile or other gas engines in which a uniform mixture of the vaporized or atomized fuel is secured by interposing an impact separator in the path of the atomized fuel jet so as to remove the larger particles therefrom and return them preferably by closed passages to the fuel chamber. In this way many grades of kerosene and crude oil can be vaporized to secure explosive mixtures for the gas engines of automobiles, etc., since the fuel is in such finely divided particles as to remain for a long time in substantially uniform suspended condition and thus promote the explosive combustion of less volatile fuels.

The accompanying drawing shows in vertical section an illustrative embodiment of this invention.

The oil or similar fuel may be supplied through the fuel pipe 18 to the valve chamber 19 in which a suitable float valve 15 may be arranged so as to be loosely connected with the float arm 14 pivoted about the pin 16, for instance. The annular or other float 12 may be connected to this float arm in any suitable way so as to operate the float valve in accordance with the level of fuel in the communicating float chamber 17. An atomizing nozzle of the desired shape and size and having, if desired, the Venturi throat 47 may be secured in position by supporting the jet tube 10 in the bottom of the float chamber as by screwing the nut 9 to the threaded lower end 8 of the jet tube. As indicated the jet tube may have a fuel nozzle 13 arranged therein and supplied with fuel through the vertical and lateral fuel passages 11, 41 communicating with the float chamber. The effective opening of this fuel nozzle may be determined by any suitable fuel valve, such as the needle valve 7 coöperating therewith extending through the bushing 45 and having, if desired, a threaded upper end 34 coöperating with a threaded aperture in the upper casing 5 which may be conveniently formed with a manifold connection or passage 20 leading to the engine cylinders. A throttle valve 21 may be arranged in this passage and its position determined by the connected stem 40 which may be adjustably connected with the valve arm 25 as by the nut 24. The serrated adjusting flange 22 may be rigidly secured to this valve stem and the corresponding flange on the valve arm may be clamped rigidly in adjusted position by the nut 24 after the desired angular adjustment of the valve arm with respect to the throttle valve has been made. The fuel valve may be adjusted simultaneously with the throttle valve by gearing these two valves together as by the valve gear 23 and the valve pinion 26 secured to the fuel valve preferably in such way as to permit the relative adjustment of these valves. The pinion and connected depending bushing may have a loose pin and slot connection with the valve as by the pin 29 extending through the upper extension 28 of the valve and through a slot, such as 32, in the bushing. A spring 31 may be arranged between the flange 33 on the lower end of this bushing and the pin or the interposed washer 30 engaging the pin so as to normally hold this valve pinion 26 in mesh with the gear 23. When desired, however, the pinion may be raised by the handle or milled head 27 so as to draw this valve pinion up out of mesh after which the valve may be rotated so as to adjust the effective opening of the fuel nozzle before allowing the pinion to be drawn into mesh with the gear. If desired, a suitable automatic air valve, such as 37, may be slidably arranged on the stem 38 so as to be normally substantially closed as by the light spring 36 and be drawn open by the suction of the engine to admit air to the air or mixing chamber 35.

Under operating conditions the engine suction creates a strong atomizing jet through the throat of the jet tube so as to draw out gasolene, kerosene or other liquid fuel from the fuel nozzle and atomize the same, the atomized jet being preferably discharged against an impact separator so that the larger particles or droplets of fuel are driven into contact therewith and separated from the lighter and finer fuel particles which are drawn into the engine cylinders. The separator may with advantage be in the form of a dome-shaped plate 1 arranged in the vapor chamber 6 above the jet tube and preferably fitting tightly around the fuel valve 7 so that the atomized fuel strikes against this separator more or less centrally and with such force as to cause the larger particles or droplets to be forced into contact with the separator because of their greater momentum. These adherent particles or droplets of fuel drain down the separator and may be advantageously removed therefrom by a suitable drain trough which may be conveniently arranged by giving the separator plate a bent back or recurved lower edge such as 48, which forms an annular drain trough 2 at its lower portion. This trough may communicate with a series of supporting drain pipes 3 which may be mounted in the metallic diaphragm or cover 53 of the fuel or float chamber so as to return this fuel to the float chamber and simultaneously support the separator in desired position. Suitable drain holes 42 may be arranged through the diaphragm at its lower central portion to similarly discharge from the vapor chamber any liquid fuel collecting in the bottom thereof. It is in some cases desirable to have the drain trough nearly closed at its upper receiving portion as by bringing the edge 48 adjacent the inner surface of the separator so as to prevent undesirable entrance of air or vapor which is guided around this drain and up outside of the separator in the upper part of the vapor chamber 6. For some purposes it is desirable to form one or more relatively narrow or small vapor passages, such as the series of cylindrical vapor passages 4 through which the vapor is delivered to the mixing chamber, since in this way the vapor can be more readily and thoroughly mixed with the supplemental air from the air valve. A carbureter of this general type when operating on ordinary kerosene thoroughly atomized or vaporized the same so that it was in the form of a whitish vapor like dense fumes or smoke which remain suspended in quite dense apparently uniform condition for a number of minutes in a room. The relatively small size of the fuel particles contribute to this relatively permanent suspension in air which is of course correspondingly valuable when using kereosene or other fuels of a less volatile character than the best grades of gasolene.
This invention has been described in connection with a number of illustrative embodiments, forms, proportions, materials, parts, arrangements and methods of adjustment and use, to the details of which disclosure the invention is not of course to be limited, since what is claimed as new and what is desired to be secured by Letters Patent is set forth in the appended claims.

I claim:

1. The gas engine carbureter comprising a float chamber having a diaphragm substantially covering the same, a coöperating jet tube extending through said diaphragm, a fuel nozzle within said jet tube and communicating with said float chamber, a vapor chamber into which said jet tube discharges, a manifold connection and an auxiliary air valve communicating therewith, a series of separated vapor passages between said vapor chamber and said manifold connection adjacent said air valve, an impact separator arranged in said vapor chamber so that the atomized jet of fuel from said jet tube is discharged upward against the central portion thereof and drain devices coöperating with said separator and discharging into said float chamber to remove from said jet larger fuel particles which are driven into contact with said separator.

2. The gas engine carbureter comprising a float chamber having a diaphragm substantially covering the same, a coöperating jet tube extending through said diaphragm, a fuel nozzle within said jet tube and communicating with said float chamber, a vapor chamber into which said jet tube discharges, a manifold connection and an auxiliary air valve communicating therewith, a communication between said vapor chamber and said manifold connection, an impact separator arranged in said vapor chamber so that the atomized jet of fuel from said jet tube is discharged against the central portion thereof and drain devices coöperating with said separator and discharging into said float chamber to remove from said jet larger fuel particles which are driven into contact with said separator.

3. The gas engine carbureter comprising a fuel chamber having a diaphragm substantially covering the same, a coöperating jet tube extending through said diaphragm, fuel feeding means coöperating with said jet tube, a vapor chamber into which said jet tube discharges to produce an atomized jet of liquid fuel in said vapor chamber, a dome-shaped impact separator arranged in said vapor chamber so that said jet of fuel from said jet tube is discharged upward against the central portion of said separator, said separator having a recurved edge forming an annular trough provided with a constricted entrance opening on the inside of the lower edge of said separator and a series of supporting drain pipes communicating with said drain trough and passing through said diaphragm to discharge into said fuel chamber.

4. The gas engine carbureter comprising a fuel chamber having a diaphragm substantially covering the same, a vapor chamber into which the fuel jet discharges, means to produce an atomized jet of liquid fuel in said vapor chamber, an impact separator arranged in said vapor chamber so that said jet of fuel is discharged upward against the central portion of said separator, said separator having a recurved edge forming an annular drain trough provided with a constricted entrance opening on the inside of the lower edge of said separator and a series of drain pipes communicating with said drain trough and passing through said diaphragm to discharge into said fuel chamber.

5. The gas engine carbureter comprising a fuel chamber having a diaphragm substantially covering the same, a vapor chamber into which the fuel jet discharges, means to produce an atomized jet of liquid fuel in said vapor chamber, an impact separator arranged in said vapor chamber so that said jet of fuel is discharged upward against the central portion of said separator, said separator having a drain trough on the lower edge of said separator and a drain pipe communicating with said drain trough and passing through said diaphragm to discharge into said fuel chamber.

6. The gas engine carbureter comprising a float chamber, a coöperating jet tube and fuel valve, a vapor chamber into which said jet tube discharges, a communicating manifold connection, an impact separator arranged in said vapor chamber to remove the larger vapor particles which are driven into contact with said separator, a throttle valve in said manifold connection, a valve arm adjustably connected with said throttle valve, a valve gear connected to said valve arm, a valve pinion to operate said fuel valve and an operating pin and slot connection between said valve pinion and said fuel valve to enable said pinion to be drawn out of mesh with said valve gear to effect the manual adjustment of said fuel valve independent of said throttle valve.

7. The gas engine carbureter comprising a float chamber, a coöperating jet tube and fuel valve, a vapor chamber into which said jet tube discharges, a communicating manifold connection, a throttle valve in said manifold connection, a valve arm adjustably connected with said throttle valve, a valve gear connected to said valve arm, a valve pinion to operate said fuel valve and a spring connection between said valve pinion and said fuel valve to enable said pinion to be drawn out of mesh with said valve gear to effect the manual adjustment of said fuel valve independent of said throttle valve.

HORACE L. KENT.

Witnesses:
HARRY L. DUNCAN,
JESSIE B. KAY.